April 7, 1970  W. H. DOUTHIT  3,505,028
MATERIAL OF CONSTRUCTION FOR EXHAUST MANIFOLD
REACTOR INNER CHAMBER
Filed March 8, 1968  3 Sheets-Sheet 1

INVENTOR
WALTER HAROLD DOUTHIT,

BY Robert E. Patridge

ATTORNEY

INVENTOR
WALTER HAROLD DOUTHIT,

BY Robert E. Patridge

ATTORNEY

April 7, 1970　　　　W. H. DOUTHIT　　　3,505,028
MATERIAL OF CONSTRUCTION FOR EXHAUST MANIFOLD
REACTOR INNER CHAMBER
Filed March 8, 1968　　　　　　　　　　3 Sheets-Sheet 3

FIG. 6

INVENTOR
WALTER HAROLD DOUTHIT

BY Robert E. Patridge

ATTORNEY

United States Patent Office 3,505,028
Patented Apr. 7, 1970

3,505,028
MATERIAL OF CONSTRUCTION FOR EXHAUST MANIFOLD REACTOR INNER CHAMBER
Walter Harold Douthit, Wilmington, Del., assignor to E. I. du Pont de Nemours and Company, Wilmington, Del., a corporation of Delaware
Continuation-in-part of application Ser. No. 638,957, May 16, 1967. This application Mar. 8, 1968, Ser. No. 716,260
Int. Cl. B01v 1/20; F01n 7/16
U.S. Cl. 23—277                                    10 Claims

ABSTRACT OF THE DISCLOSURE

Automotive exhaust manifold reactors having inner chambers composed of a non-magnetic, austenitic, iron-nickel-chromium alloy as substrate, which, by weight, has an iron content of about 22–55%, a carbon content of less than about 0.5%, a chromium content of at least about 10%, a nickel content of at least about 11% +.07 × percent Cr but not greater than about 50%, a total iron, nickel and chromium content of at least about 90%, and which has on substantially all surfaces an aluminum-containing diffusion coating about 1–10 mils thick containing a layer about 0.5–7 mils thick which contains a major amount of nickel aluminide of the crystalline structure of NiAl.

CROSS-REFERENCE TO RELATED APPLICATION

This is a continuation-in-part of application Ser. No. 638,957, filed May 16, 1967, now abandoned.

BACKGROUND OF THE INVENTION

Field of the invention

This invention relates to exhaust manifold reactors which are used to reduce atmospheric contamination by incompletely burned exhaust gases from internal combustion engines. In particular, it pertains to exhaust manifold reactor inner chambers composed of materials which can withstand the severe chemical and physical conditions to which such parts are subjected during normal use.

Description of the prior art

The exhaust gases emitted by automobiles and trucks normally contain significant quantities of hydrocarbons and carbon monoxide. In recent years, the problem of emission of unburned hydrocarbons and oxidation products by automotive vehicles has assumed greater importance with the recognition that these hydrocarbons may constitute significantly to atmospheric pollution in metropolitan areas. Considerable effort has been directed toward devising ways of operating internal combustion engines so as to reduce the amount of hydrocarbon and carbon monoxide in the exhaust gas and toward developing economical devices for treating exhaust gases to eliminate or significantly reduce the amount of hydrocarbon and carbon monoxide contained in them.

One of the approaches to reducing the amount of unburned hydrocarbons and carbon monoxide in exhaust gases has been modification of the operating adjustments of the engine. Automotive engines generally operate more smoothly and have more desirable performance characteristics when the fuel-air mixture is richer than stoichiometric. With such mixtures additional air is required for complete oxidation of the exhaust gases. In U.S. Patent 2,263,318, Tifft describes the addition of air to the exhaust gases through tubes located near the exhaust valves. Introduction of auxiliary air in this manner allows further oxidation of the exhaust gases in the manifold portion of the exhaust system. A similar result can also be achieved by setting the carburetor to give a stoichiometric or somewhat leaner fuel-air mixture.

It has also been suggested that modifications of the traditional exhaust manifold can be made to increase its efficiency as an oxidation reactor. Several different designs have been proposed which promote continued oxidation of incompletely burned exhaust gases. In U.S. Patent 3,302,394, Pahnke and Sowards describe one type of exhaust manifold reactor in which an inner reaction chamber, surrounded by heat-reflecting structures and an outer shell, is connected directly to the exhaust ports of the engine. The exhaust gases pass from the inner chamber into spaces between the inner chamber and the outer shell and around the heat-reflecting structures before passing to the exhaust pipe.

In U.S. application Ser. No. 618,392, filed Feb. 24, 1967, now U.S. Patent 3,413,803, Rosenlund and Douthit described another exhaust manifold reactor in which the exhaust gases pass directly from the exhaust ports of the engine to a mixing zone in the inner reaction chamber through passage means having limited cross-sectional areas. The gases then pass indirectly from the inner chamber through the annular space between the inner chamber and the outer shell to the reactor outlet.

Both the Pahnke and Sowards and the Rosenlund and Douthit disclosures stress the importance of conserving heat within such reactors and suggest the use of thin-walled members for all parts of the reactor within the outer shell. Accordingly, these thin-walled parts, which are exposed to high temperature oxidizing exhaust gases and changing thermal stresses, are particularly susceptible to failure if made of inappropriate materials.

Temperatures inside an exhaust manifold reactor depend on the operating conditions of the engine and change rapidly during normal operation. Manifold reactor temperatures may cycle rapidly between about 800° to 900° F. during idle and about 1650° to 1850° F., or higher, during normal start-up, cruise and deceleration, and may briefly reach 1950° F., or higher, during rapid, rich-mixture decelerations and during engine malfunction. These extreme conditions will cause failure of various parts of an exhaust manifold reactor made from common metals of construction.

Although much investigation of exhaust manifold reactors has been carried out in recent years, no completely satisfactory material of construction for inner chambers has been suggested. To be practical, a particular material must have adequate strength to maintain the desired shape in thin sections at temperatures as high as 2000° F., resistance to scaling, spalling, erosion, and other effects of high temperature oxidizing conditions, and resistance to cracking and deformation caused by changes in crystalline structure and other metallurgical changes which may take place during heating to or cooling from elevated temperatures. The material must also be relatively inexpensive and easily fabricated. No material of construction has been suggested heretofore which meets all of these necessary requirements.

The high-phosphorous cast irons used in conventional automotive exhaust manifolds lose strength at temperatures well below those to which exhaust manifold reactor inner chambers are exposed. Also mild steels, like S.A.E. 1020 steel, formed in the required thin sections, lose strength at temperatures well below 2000° F. and oxidize rapidly in the high temperature atmospheres present in exhaust manifold reactors.

On the other hand, high nickel materials such as the TD Nickel alloy (nominally 98% nickel and 2% thoria) suggested in Example 1 of the Pahnke and Sowards patent, are too expensive for us in exhaust manifold reactors. Less expensive iron-based materials such as the Type 304 stainless steel suggested in Example 2 of the Pahnke and Sowards patent are not suitable for use at the high temperatures encountered by the inner chamber of exhaust manifold reactors because of excessive oxidation scaling and distortion due to creep and grain growth. Exhaust manifold reactor inner chambers made of this material have been found to fail after only a few thousands miles of normal use on a car.

SUMMARY OF THE INVENTION

It has now been discovered that exhaust manifold reactor inner chambers composed of certain iron-nickel-chromium alloys which have a particular aluminum-containing diffusion coating have the requisite durability to withstand the high and cyclic temperatures and the oxidizing atmospheres present in exhaust manifold reactors while being sufficiently inexpensive that they do not substantially increase the cost of the exhaust manifold reactor. More particularly, the exhaust manifold reactor inner chambers of this invention are composed of a non-magnetic, austenitic, iron-nickel-chromium alloy, as substrate, which, by weight, has an iron content of about 22–55%, a carbon content of less than about 0.5%, a chromium content of at least about 10%, a nickel content of at least about 11%+0.7×percent Cr but not greater than about 50%, and a total iron, nickel and chromium content of at least about 90%, said chamber having on substantially all surfaces an aluminum-containing diffusion coating about 2–10 mils thick containing a layer about 0.5–7 mils thick which contains a major amount of nickel aluminide of the crystalline structure of NiAl, said coated alloy not having a magnetic attraction greater than about 20% that of fully annealed S.A.E. 1020 steel.

DETAILED DESCRIPTION OF THE INVENTION

The iron-nickel-chromium alloys used as the substrate metals in accordance with this invention are all austenitic in crystalline structure. Austenitic structures in such alloys are solid solutions in a face-centered cubic crystal lattice. Suitable alloys are those in which the iron content ranges from about 22–55%, the carbon content is less than about 0.5%, the chromium content is at least about 10%, the nickel content ranges from about 11%+0.7×percent Cr to 50% and the total iron, nickel, and chromium content is at least about 90%. The substrate alloy should contain less than about 0.5% carbon since excessive carbon leads to low ductility.

Preferably the substrate metal is composed of a non-magnetic, austenitic, iron-nickel-chromium alloy containing, by weight, about 25–50% iron, less than about 0.2% carbon, at least about 15% chromium, a nickel content of at least about 15%+0.7×percent Cr but not greater than about 45%, and a total iron, nickel and chromium content of at least about 95%. Particularly preferred substrate materials are alloys containing about 44–48% iron, less than about 0.1% carbon, about 30–34% nickel, about 18–22% chromium and a total iron, nickel, chromium content of at least about 97%. A commercial alloy falling within this category is "Incoloy" 800.

The following table gives the approximate composition of six commercial iron-nickel-chromium alloys which are suitable for use as substrate materials in accordance with this invention followed by three alloys which are not within the scope of this invention.

TABLE

| Alloy No. | Alloy name | Approximate composition, weight percent | | | | | | | | | |
|---|---|---|---|---|---|---|---|---|---|---|---|
| | | Fe | Ni | Cr | C | Ti | Mn | Mo | W | Si | Others |
| 1 | "Incoloy" 800 | 46 | 32 | 20.5 | .04 | .30 | .75 | | | .35 | Traces |
| 2 | 35–20 | 45 | 35 | 20 | low | | | | | | Traces |
| 3 | ATV-3 | 50 | 27.4 | 15 | .4 | | 1.4 | | 4 | 1.2 | |
| 4 | "Incoloy" 901 | 38 | 40 | 13 | .04 | 2.5 | | 6 | | | Traces |
| 5 | 16-26-6 | 53 | 25 | 16 | Low | | | 6 | | | Traces |
| 6 | "Incoloy" 804 | 25 | 43 | 29 | .06 | .4 | .85 | | | .5 | Traces |
| 7 | 304 stainless steel | Bal. | 8–12 | 18–20 | ¹.08 | | ¹2 | | | ¹1 | Traces |
| 8 | 310 stainless steel | Bal. | 19–22 | 24–26 | .08–.25 | | ¹2 | | | ¹1.5 | Traces |
| 9 | 316 stainless steel | Bal. | 10–14 | 16–18 | ¹.8 | | 2.0 | 2–3 | | | Traces |

¹ Max.

This invention is primarily based on the experimental finding that certain iron-nickel-chromium alloys which have aluminum-containing diffusion coatings can withstand the severe conditions encountered by exhaust manifold reactor inner chambers. It has been found that the success or failure of coated exhaust manifold reactor inner chambers in actual use cannot be predicted based upon exposure of the parts to the oxidizing and reducing atmospheres in typical constant temperature furnace screening tests, commonly called "muffle furnace" tests. Actual service envrionmental conditions are required. Muffle furnace tests do not include the high velocity gases, highly erosive environments, thermal stress gradients, and metal fatigue conditions encountered in actual use of an exhaust manifold reactor. Under actual service conditions, cracks can develop and propagate into and through the underlying substrate metal thereby causing failure.

As a result of actual use tests, it has been found that both the composition of the substrate metal and the kind of coating are critical. Selection of a suitable subtrate metal for use in accordance with this invention cannot be predicated upon the durability of the uncoated substrate metal. On the other hand, the composition of the substrate metal cannot be disregarded merely because it is not directly exposed to the corrosive effects of the exhaust gases. The composition of the substrate is important in that it affects the composition of the diffusion coating. In other words, the durability of an aluminum-containing diffusion coating under the severe conditions present in an exhaust manifold reactor will vary depending upon the composition of the substrate with which the coating is diffused. It has been found that if the substrate alloy contains less chromium or nickel than that specified in accordance with this invention, failure occurs due to cracking and excessive distortion of the part. It is believed that this failure is due to the incompatibility of the coating with the substrate under the severe thermal stress conditions encountered by exhaust manifold reactor inner chambers in actual use.

Although it is not intended that this invention be limited to any particular theory, it is believed that the favorable results of this invention can be explained by the fact that the composite coated alloy materials of this invention never contain more than small amounts of ferritic iron-based metallurgical structures. Ferritic structures are solid solutions in a body-centered cubic crystal lattice of iron rather than a face-centered cubic lattice as in the case of austenitic structures. When the substrate alloy being coated contains more chromium or less nickel than that specified in accordance with this invention, metallurgical changes take place during the coating process which result in the formation of a substantial amount of ferritic metallurgical structures. These ferritic structures can be detected by measuring the ferromagnetic character of the coated alloy.

Exhaust manifold reactor inner chambers composed of aluminum-containing diffusion-coated alloys which contain more than small amounts of ferritic structures have been found to fail during use due to excessive distortion and cracking. The tendency of these inner chambers to fail in use has been found to correlate with the ferromagnetic properties of the part. Suitable coated alloys have been found to be those which do not have a magnetic attraction greater than about 20% that of fully annealed type S.A.E. 1020 steel.

Figure 6:
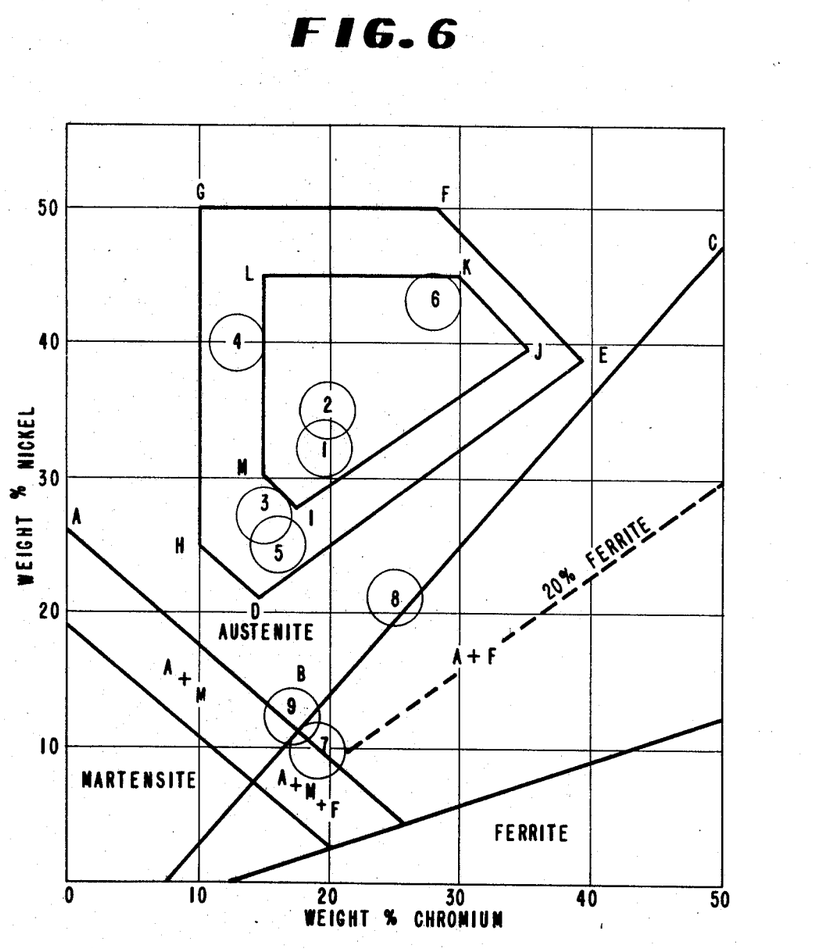
FIGURE 6 is a modification of what is commonly called a "Schaeffler-type diagram" which shows the metallurgical structures expected in iron-nickel-chromium alloys of various compositions.

Referring now to FIGURE 6, the commercial alloys listed in the above table are plotted on the diagram and are identified by the alloy number used in the table. The compositions of these alloys are plotted as circles since some heat-to-heat variations may be encountered. It is apparent from the diagram that all alloys with compositions plotted above the line ABC are austenitic in structure. Since aluminum is known to be a strong ferrite former, it can be seen that aluminum-containing diffusion coating of an austenitic iron-nickel-chromium alloy having a composition plotted just above the line BC results in the formation of ferrite structures due to both the addition of aluminum and a resulting decrease in the nickel content of the coated alloy. For example, a typical aluminum-containing diffusion coated Type 310 stainless steel (alloy No. 8 in the table and FIGURE 6) will have about 50% of the magnetic attraction of fully annealed S.A.E. 1020 steel.

It has been found that the DE line, which defines the minimum amount of nickel necessary to obtain a satisfactory result in accordance with this invention, parallels the 20% ferrite line on the Schaeffler diagram. It is believed that the presence of the aluminum coating component on Type 310 stainless steel reduces the nickel content of the alloy below 20% to give a finite layer having a composition plotted below the 20% ferrite line in the diagram. Exhaust manifold reactor inner chambers of aluminum-containing diffusion coated Type 310 stainless steel have been found to fail after undesirably short periods of use because of distortion and crack formation due to the incompatibility of the coating with the substrate.

The iron-nickel-chromium alloys which are satisfactory substrates for the exhaust manifold reactor inner chambers of this invention are all within the area DEFGH of the diagram of FIGURE 6. This area defines austenitic alloys which contain sufficiently high percentages of chromium and nickel that the crystalline structures in the coated alloy do not contain a substantial amount of ferritic structures. Line DE, defined by the algebraic equation percent $Ni = 11\% + 0.7 \times$ percent Cr, represents the minimum amount of nickel necessary to assure that the coated alloy not contain a substantial amount of ferritic structures. The line GH represents a minimum of about 10% chromium which is required in the iron-nickel-chromium alloy to assure durability at high temperatures.

The line EF in the diagram of FIGURE 6 represents the minmum of about 22% iron required in the substrate alloys used in exhaust manifold reactor inner chambers of this invention. An iron content of about 22–55% is required in the alloy to obtain a coated alloy of the desired crystalline structures. The line HD represents the minimum combination of nickel and chromium allowable in accordance with this invention. When the iron content is at its maximum of 55%, the content of ingredients other than iron, nickel and chromium are at their maximum of 10%, and the chromium content is at its 10% minimum, the minimum amount of nickel possible within the scope of this invention is 25% as represented by the point H. The point D represents the 20.6% minimum nickel content in accordance with the equation percent $Ni = 11\% + 0.7 \times$ percent Cr when the combination of nickel and chromium is at its minimum of 35% under the same conditions. The line FG represents a maximum nickel content of 50% and is based upon economic considerations since nickel is the most expensive of the essential ingredients in the substrate alloy.

The area defined by IJKLM corresponds to the preferred composition of the substrate alloy. The line IJ represents the relationship percent $Ni = 15\% + 0.7 \times$ percent Cr. The line JK represents a minimum iron content of 25%, while the line KL represents a maximum nickel content of 45%. The line LM represents a minimum chromium content of 15%. The line MI is determined by considerations similar to those used to determine line HD except that preferred limits, namely, a minimum chromium content of 15%, a maximum iron content of 50%, a minimum nickel content of $15\% + 0.7 \times$ percent Cr, and a maximum content of ingredients other than iron, nickel and chromium of 5%, are used.

In accordance with one embodiment of this invention, the aluminum-containing diffusion coating is applied by a process in which aluminum or a mixture of elements, at least one of which is aluminum, is transferred to the substrate from a suitable carrier material and diffuses with the substrate constituents to form a composite layer at the surface. Such coatings are different from coatings applied by processes such as electrodepositing, spraying, painting or dipping which do not incorporate as part of the procedure a high temperature diffusion operation.

The aluminum-containing diffusion coatings applied to the austenitic iron-nickel-chromium alloy substrates in making the inner reaction chambers of this invention may be produced by various processes known to those skilled in the art. Suitable aluminizing processes are described by Samuel and Lockington in Chemical and Process Engineering, vol. 45 (1964), p. 249 et seq.; Metal Treatment and Drop Forging, vol. 18 (1951), pp. 354 to 359; and in the Metals Handbook of the American Society for Metals, 8th ed., vol. 2 (1964), pp. 489–496. The Metals Handbook reference describes processes such as hot dipping followed by heat treating to diffuse the coating into the coating into the substrate, pack diffusion processes, slurry ("powder-paint") processes including thermal diffusion, and spray coating followed by thermal diffusion.

A common method of applying an aluminum-containing diffusion coating is by the pack method. In this method, the articles to be coated are packed or tumbled in a powder blend containing an elemental source of aluminum such as powdered aluminum or aluminum alloy, a carrier material or transfer agent such as ammonium chloride, and an inert filler material such as aluminum oxide, and heated at temperatures in the range of about 1000° to 2300° F. for about one-half to 36 hours until a sufficiently thick aluminide-containing layer or layers are formed in the articles being coated. As is well known to those skilled in the art, additional elements such as chromium can also be transferred with the aluminum from appropriate source materials to the surface of the articles being coated to form coatings with special high temperature oxidation and erosion resistance. A two-step process is described by Galmiche in U.S. Patent 2,801,187 and by Monson in U.S. Patent 3,290,126, whereby chromium in the first step and then aluminum in the second are transferred to the articles being coated. The iron-nickel-chromium alloy substrates of this invention may be used in place of the TD Nickel substrate taught by Monson.

Another suitable method of applying an aluminum diffusion coating is by hot dipping in aluminum followed by thermal diffusion. By this process clean metal articles are dipped in molten aluminum for a period of less than about 5 minutes. The aluminum bath is held at about 1300° F. Dipping is followed by a diffusion treatment which comprises heating in air or an inert atmosphere at a temperature of about 1600 to 2000° F. for a period of about 5 minutes to 3 hours. A protective nickel-aluminide surface layer is formed. Similar diffusion coatings can be applied by various slurry, vapor and spray processes which are followed by a diffusion heat treatment.

Aluminum-containing diffusion coatings can be obtained in thicknesses of from less than about 1 mil to more than about 10 mils by proper control of the diffusion coating process. Suitable coating thicknesses for use on exhaust manifold reactor inner chambers are about 1–10 mils; thicker coatings tend to crack on cyclic heating and cooling, while thinner coatings tend to provide inadequate surface protection. When the diffusion coating is transferred from an aluminum-containing carrier material, the coating is generally about 2–10 mils thick. Preferably the total coating is about 3–7 mils thick. The nickel aluminide layer of the coating should be 0.5–7 mils thick, and preferably about 1–5 mils thick.

By "nickel aluminide of the crystalline structure of NiAl" is meant a phase which is a solid solution having a crystalline structure of the NiAl type, but with the possibility of some substitution of other elements, for example iron, chromium and titanium for the nickel or aluminum in the crystal lattice structure. The nickel aluminide layer may also contain one or more other phases in admixture with the nickel aluminide phase, but must contain a major amount of nickel aluminide. By "major amount" of nickel aluminide, it is meant that the nickel aluminide layer contains more than 50% by volume of the nickel aluminide phase of the crystalline structure of NiAl.

Figure 3:
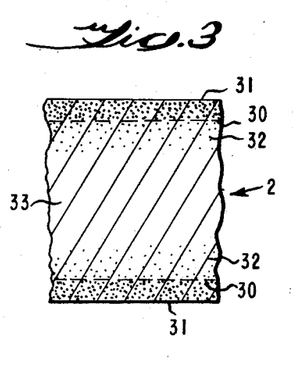
FIGURE 3 is a cross-section of the coated metal wall of inner chamber 2 of the exhaust manifold reactor of FIGURE 1.

Application of the aluminum containing diffusion coating to the substrate alloy causes an increase in the size of the part equal to about one-half of the total coating thickness. A typical coated alloy is illustrated in FIGURE 3 of the drawing. Referring now to FIGURE 3, the original dimensions of the substrate alloy before being coated are defined by lines 30. After applying the aluminum-containing diffusion coating, the coated alloy has the dimensions defined by lines 31 at the surface of the coating. Aluminum and any other coating constituent such as chromium diffuses into the alloy substrate in the areas designated 32. The area of the alloy substrate in which no diffusion takes place is designated 33. The density of the coating constituents is represented by the density of the dots in FIGURE 3. The composition of total coating and the exact location of the nickel aluminide layer will vary depending upon the specific composition of the substrate alloy and the particular coating constituents.

The coated alloys of this invention should not have a magnetic attraction greater than about 20% that of fully annealed S.A.E. 1020 steel. The magnetic character of the coated alloys can be measured using various scientific instruments which indicate the magnetic attraction of the material. A suitable instrument for making these measurements is the "Pocket Handy Gauge" Model H–543, sold by Platers Research Corp., New York, N.Y. The non-magnetic austenitic substrate alloys used in the practice of this invention give zero readings indicating no magnetic attraction. Coated alloys within the scope of this invention give readings of not greater than about 20% that of fully annealed S.A.E. 1020 steel. Preferably, the coated alloy does not have a magnetic attraction greater than about 15% that of fully annealed S.A.E. 1020 steel. It has been found that these readings of the magnetic attraction of the material of construction correlate quite closely with the useful life of the inner reactor chamber, regardless of the thickness of the coating. It is believed that this phenomenon may be due to the fact that thicker coatings result in a corresponding increase in the amount of undesirable ferritic structures.

Figure 1:
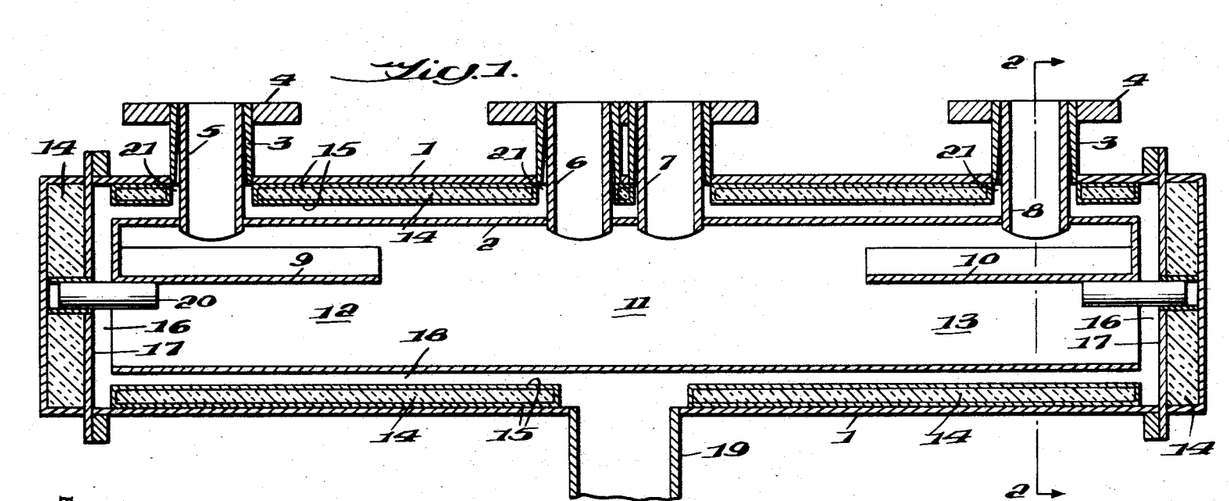
FIGURE 1 illustrates a plan view in section of a suitable exhaust manifold reactor for practising this invention.

Suitable exhaust manifold reactors which are improved by the use of the material of construction of this invention are illustrated in FIGURES 1, 2, 4 and 5. Referring now to FIGURE 1, the exhaust manifold reactor is based upon two concentric members, an outer shell 1 and an inner reaction chamber 2. Outer shell 1 has integral shell extensions 3 and flanges 4 which may be used to connect the outer shell of the reactor to the internal combustion engine adjacent to the exhaust ports of the engine. The reactor illustrated in FIGURE 1 is designed for use in connection with four exhaust ports of the engine. Extensions 3 surround exhaust port extension conduits 5, 6, 7 and 8 which direct the flow of exhaust gases from the four exhaust ports of the engine (not illustrated) through outer shell 1 into inner chamber 2.

Figure 2:
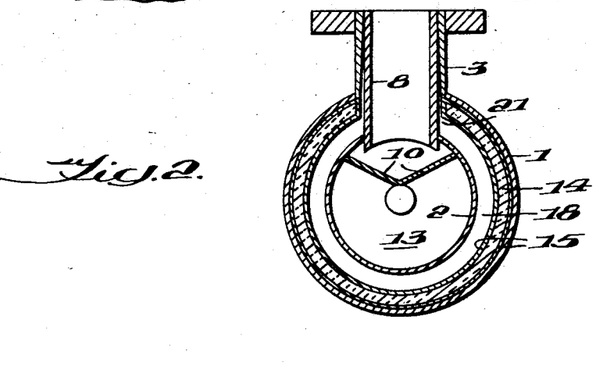
FIGURE 2 illustrates a section of the exhaust manifold reactor of FIGURE 1 taken along line 2—2 of FIGURE 1.

Inner chamber 2, which acts as the manifold contains baffles 9 and 10 which direct the exhaust gas passing from port extension conduits 5 and 8 to mixing zone 11 of inner chamber 2. Turbulent mixing of the reacting gases takes place in mixing zone 11 due to alteration in flow from the different exhaust ports of the engine as governed by the timing which controls the firing sequence of the engine. The cross-sectional area of the passage means above baffles 9 and 10 is restricted by the V-shape of these baffles as illustrated in FIGURE 2. Baffles 9 and 10 may also be U-shaped or in any other shape which can be conveniently fabricated.

As illustrated in FIGURES 1 and 2, the cross-sectional area of the passage means above baffles 9 and 10 is substantially equivalent to the cross-sectional area of the port extension conduits which are also substantially equivalent to the cross-sectional area of the ports of the engine. Restriction of the cross-sectional area of these passages maintains the velocity of these gases entering the mixing zone whereby the temperature in the inner reaction chamber is increased. This increase in temperature has a favorable influence upon the efficiency of the reactor in reducing the concentration of hydrocarbons and carbon monoxide in the exhaust gases.

Oxidation of hydrocarbons and of carbon monoxide contained in the exhaust gases is accelerated in mixing zone 11 and continues as the reacting gases flow through the remainder of the reactor. Under the firing sequence of a typical four cycle internal combustion engine, no two cylinders fire simultaneously. Thus, inner reaction chamber 2 at any given time contains exhaust gases from primarily one exhaust port. However, because of the limited size of the exhaust manifold reactor, there will be some impact and intermixing between the end portion of exhaust gas from one exhaust port and beginning portion of exhaust gas from the next exhaust port in the firing sequence. When air injection is used in combination with the exhaust manifold reactor, further turbulence is caused in mixing zone 11 by impact between the stream of air coming from three of the exhaust port extension conduits and the exhaust gas from the fourth port extension conduit entering the mixing zone at angles of at least 80° with respect to each other. Turbulence is also caused by sharp turns required for the exhaust gas to exit mixing zone 11 into exit zones 12 and 13 of the inner reaction chamber. In order to equalize pressure within the system approximately half of the exhaust gas within mixing zone 11 will exit the inner chamber through exit zone 12 and the other half through exit zone 13.

Outer shell 1 may be insulated on its interior surface by a layer of insulation 14. The insulating layer 14 may be of any structure and composition which provides effective insulation and has a practical life under the conditions existing within the reactor. The high temperatures, oxidizing atmosphere, and erosive conditions make it desirable to use liners 15 when the insulating material is not sufficiently durable by itself. Useful insulating materials are fibrous ceramic materials with thermal conductivities of approximately 0.8 B.t.u./hr./° F./sq.ft./in. An effective method of utilizing these materials in thin layers is to sandwich the insulation between two concentric metal tubes with a wall thickness of about 0.030 inch as illustrated by liner 15.

Exhaust gases exiting inner chamber 2 through exit zones 12 and 13 undergo sharp changes in direction in zones 16 at the open ends of inner chamber 2 due to impingement with end cap 17 which acts as a liner for insulation 14 at the ends of outer shell 1. The reacting gases then flow through the annular space 18 between inner reaction chamber 2 and the concentric insulating layer 14 longitudinally toward the center of the reactor and circumferentially around inner chamber 2 to exit through exhaust pipe connection 19.

Normal operation of an automobile exposes exhaust manifold reactors to quick, large and severe changes in temperature. For instance, portions of the reactor are quickly heated to about 1500° F. soon after the engine has started, while other parts of the same reactor may remain at temperatures below 500° F. after many minutes of operation. Moreover, the temperature to which individual parts of the reactor are exposed is also constantly changing. Experience has shown that inner chamber 2 is subject to severe thermal stresses and expansion which could cause distortion and eventually cracking and other failures of the reactor. Accordingly, inner chamber 2 and exhaust port extension conduits 5, 6, 7 and 8 are provided with slipfit attachment to outer shell 1. Inner chamber 2 is mounted within outer shell 1 by means of plug 20 which slips within a mounting in outer shell 1 thereby allowing inner chamber 2 to move in a longitudinal direction with respect to outer shell 1 during expansion and contraction.

Outer shell extensions 3 are tapered so as to provide an annular space 21 between exhaust port extension conduits 5, 6, 7 and 8 and outer shell extensions 3. This arrangement allows port extension conduits 5, 6, 7 and 8 to move within annular space 21 as inner chamber 2 moves longitudinally under expansion and contraction. Annular spaces 21, which are in communication with annular space 18, provide means for preheating exhaust gases entering inner chamber 2 through exhaust port extension conduits 5, 6, 7 and 8. This expedient, in combination with the high velocity at which the exhaust gases pass through exhaust port extension conduits, conserves heat and thereby contributes to increasing the temperature of the oxidation reaction within the reactor.

Figure 4:
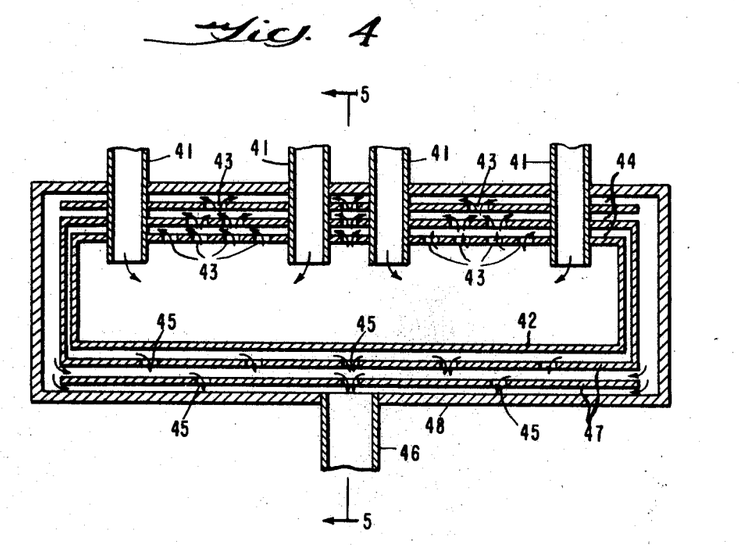
FIGURE 4 represents a plan view in section of an exhaust manifold reactor which is a modification of the reactor of FIGURE 1.
Figure 5:
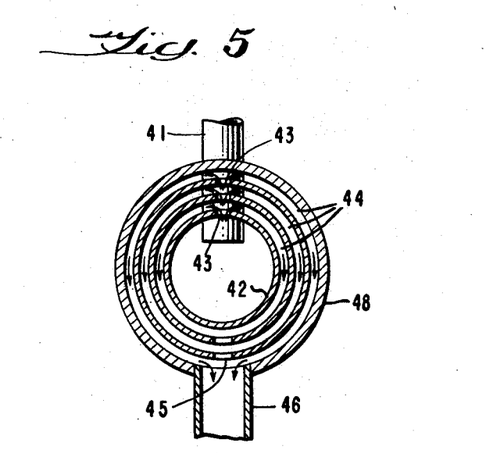
FIGURE 5 illustrates a section of the exhaust manifold reactor of FIGURE 4 taken along line 5—5 of FIGURE 4.

In the exhaust manifold reactor illustrated in FIGURES 4 and 5, the flow of exhaust gas passes circumferentially around the interior of the reactor between the inner chamber 42 and outer shell 48. Referring now to FIGURE 4, exhaust gases and auxiliary air, if used, flow from the exhaust ports of the engine through exhaust port extension conduits 41 into inner reaction chamber 42. The gases exit inner chamber 42 through a multiplicity of openings 43, flow through passages 44, and exit through openings 45 into exhaust pipe 46. The assembly includes one or more heat reflecting members 47. Outer shell 48 may contain an insulating layer as illustrated in FIGURE 1. The inner reaction chamber walls, heat reflector surfaces, and outer shell walls are arranged essentially parallel to each other as concentric shells surrounding the length of the reactor and are essentially continuous except for the openings required for passage of the exhaust gases. These shells need not be circular in nature but could be rectangular, oval, or any other convenient shape.

The outer shell of the reactors of FIGURES 1 and 4 may be made of common materials such as cast iron or welded steel. The inner reaction chambers are made of the aluminum-containing diffusion coated substrate alloys in accordance with this invention. Other internal parts such as heat reflecting shields, linings for insulation, exhaust port extension conduits, and other parts which are subjected to high temperatures may also be made of the coated alloy materials disclosed herein. Suitable metal thicknesses for these internal parts may range from a few to about 200 thousands of an inch and preferably less than about 70 thousandths of an inch. There is essentially no lower limit on the thickness of the metal since thinner metal thicknesses lead to greater reactor efficiency. Accordingly, the thickness of the material of construction is a compromise between this efficiency and the durability of the reactor.

A number of different methods of fabricating the inner reaction chambers of this invention are available. The chamber can be first fabricated from the substrate alloy and then the part can be completely coated with the aluminum-containing diffusion coating. Alternatively, sheets of the substrate alloy of suitable thickness may be coated prior to fabrication of the inner reaction chamber. In this case, tube forming of the coated sheet to provide cylindrical inner reaction chambers can be accomplished by the use of an interlocking seam and port holes could be stamped out before coating.

EXAMPLES OF THE INVENTION

The following examples, illustrating the preparation and durability of exhaust manifold reactor inner chambers composed as described herein, are given without any intention that the invention be limited thereto. All percentages are by weight.

EXAMPLE 1

Exhaust manifold reactors similar to that illustrated in FIGURES 4 and 5 were used to test the durability of exhaust manifold reactor parts. The inner chambers of the reactors were nominal 2-inch diameter, cylindrical, about 0.030-inch thick tubes of "Incoloy" 800. Each inner chamber was aluminum diffusion coated by a pack process using the container and furnace assembly illustrated by Monson in FIGURE 1 of U.S. Patent 3,290,126. The pack material comprised a mixture of 5% powdered aluminum of −100 mesh particle size, 94.7% powdered alumina of −100 mesh particle size, and 0.3% ammonium chloride. Following the procedure of Example 1 of the Monson patent, the container with the inner chamber and pack material was heated for 5 hours at 1900° F. in a flow of argon gas. After this heating, the flow of argon was continued, while the pack was cooled to room temperature. The pack was then opened and the inner chamber removed. The inner chambers were completely covered by an aluminum coating 3.1 mils thick.

The magnetic attraction of the inner chambers was tested with a "Pocket Handy Gauge" manufactured by Platers Research Corp., Model H–543, and gave a reading of 3. The inner chambers before coating were nonmagnetic and gave zero readings. In comparison, fully annealed S.A.E. 1020 steel gave a reading of 36.

Two exhaust manifold reactors were mounted on opposite banks of cylinders of a 1965, 283-cubic inch Chevrolet V–8 engine with automatic transmission. The engine was mounted on a test stand and connected to a dynamometer with an inertia flywheel and controls permitting operation under cyclic conditions. The engine was equipped with the complete air injection system installed on automobiles sold in California in 1966. The auxiliary air was introduced into the exhaust ports of the engine near the exhaust valves.

The test procedure involved alternate operation with reactor temperatures near the lowest expected in normal car operation and near the highest expected under extreme driving conditions and minor engine malfunction. It included alternately idling the engine for five minutes at 650 r.p.m. with a light load, and operating the engine for five minutes at high speed and heavy load with the spark timing, air to fuel ratio, and amount of auxiliary air adjusted to obtain high manifold reactor temperatures.

The inner reactor chambers were removed periodically for weighing to determine weight change due to scaling and erosion, and for visual inspection of pitting, erosion, cracks and shape distortion. After termination of the tests, cross-sections of the chamber walls were examined metallurgically for structural changes. The inner chambers increased in weight slightly during a 250-hour cyclic test with maximum temperatures approaching 1950° F., but showed no evidence of distortion or cracking.

For comparison, inner chambers, fabricated from 0.065-inch thick, Type 310 and 316 stainless steels, which are not within the scope of the invention, were aluminum diffusion coated and tested in a similar manner. With the "Pocket Handy Gauge" the uncoated stainless steels gave zero readings. Both coated stainless steels gave readings in the range of 20 to 22, indicating their highly magnetic character. Although the coated stainless steel inner chambers changed very little in weight during the 250-hour cyclic test, they failed in an undesirably short period of time because of distortion and crack formation. These cracks and distortions resulted from the incompatibility of the coating with the substrate.

EXAMPLE 2

The procedure of Example 1 was repeated except that "Incoloy" 804 was used in place of "Incoloy" 800. The coated alloy was essentially non-magnetic. The inner chamber showed no evidence of distortion or cracking.

EXAMPLE 3

Two inner reaction chambers similar to that illustrated in FIGURES 4 and 5 were chromium and aluminum diffusion coated by a one-step process using the same container and furnace assembly as in Example 1. The pack material comprised a mixture of 29.25% powdered alumina of −100 mesh particle size, 70% powdered chromium-iron-aluminum alloy, 0.1% powdered aluminum of −100 mesh particle size, 0.4% ammonium chloride, 0.1% ammonium fluoride, 0.1% potassium fluoride and 0.05% sodium chloride. The powdered alloy was produced by melting a charge of 82.5% chromium, 7.5% iron, and 10% aluminum and crushing the cast ingot to −100 mesh particle size.

Following the coating procedure of Example 1 of the Monson patent, the container with the inner chambers and pack material was heated for 5 hours at 1850° F. in a flow of argon gas. The flow of argon gas was continued while the temperature was increased to 1910° F. and the pack was held at this temperature for an additional 3 hours. After this heating, the flow of argon gas was continued while the pack was cooled to room temperature. The pack was then opened and the inner chambers were removed.

A coating about 3 mils thick was obtained which was composed of three principal layers. The outer layer contained more than 45% chromium, but also contained less than 35% each of nickel, aluminum and iron. The intermediate layer contained a major amount of nickel aluminide of the crystalline structure of NiAl. The inner layer comprised a two-phase mixture of nickel aluminide of the crystalline structure of NiAl and a metallic solid solution containing principally the substrate alloying elements. Using the "Pocket Handy Gauge," the coated part was determined to be essentially non-magnetic.

Two exhaust manifold reactors similar to that illustrated in FIGURE 4 and containing the above inner chambers were mounted on opposite banks of cylinders of a 1965, 283-cubic inch Chevrolet V–8 engine with automatic transmission as described in Example 1.

The exhaust manifold reactors were tested and periodically examined as described in Example 1. After termination of the tests, cross-section of the inner chamber walls were examined metallurgically for structural changes. The inner chambers increased in weight slightly during the 250-hour cyclic test, but showed no evidence of distortion or cracking.

For comparison, inner chambers, fabricated from 0.065 inch thick, Type 304, 310 and 316 stainless steel, which are not within the scope of this invention, were chromium and aluminum diffusion coated and tested in a similar manner. Using the "Pocket Handy Gauge," the coated stainless steel inner chambers gave readings of at least 20. During testing, the coated stainless steel inner chambers failed in an undesirably short period of time because of distortion and crack formation resulting from incompatibility of the coating with the substrate.

EXAMPLE 4

Two exhaust manifold reactor assemblies similar to that illustrated in FIGURES 1 and 2 were fabricated with the inner chambers made of 0.065 inch thick "Incoloy" 800 chromium and aluminum diffusion coated to a thickness of 5 mils by the process described in Example 3. These reactor assemblies were installed on opposite banks of cylinders in the V–8 engine of a 1965 Chevrolet passenger car outfitted with the air injection system used on cars sold in the State of California in 1966. After 30,000 miles of driving, the inner chamber of the exhaust manifold reactor showed no evidence of distortion in shape, erosion, cracking or other deterioration.

EXAMPLE 5

Exhaust manifold reactor assemblies similar to that illustrated in FIGURES 1 and 2 were fabricated with the inner chambers made of 0.060 inch thick "Incoloy" 800 coated by a hot dip aluminum coating process followed by thermal diffusion. The "Incoloy" 800 inner chambers were first preheated in a molten flux bath of 1300° F. which also cleaned the metallic surfaces. This treatment was followed by a 30-second dip in molten aluminum held at 1400° F. The parts were allowed to cool and heated in air for two hours at 1900° F. in an electric furnace. The air heat treatment produced a thin, loose surface layer of aluminum oxide which was removed by grit blasting with fine aluminum oxide powder. A surface layer of nickel aluminide remained. The parts were slightly magnetic and gave a reading of 1 when tested with the "Pocket Handy Gauge." The inner chambers showed no evidence of distortion or cracking when subjected to the 250-hour cyclic test described in Example 1.

An "Incoloy" 800 test sample test coupon which had been treated in the same manner as the inner chamber was sectioned and examined metallographically. The nickel aluminide layer was measured and found to be 2 mils in thickness. A sub-surface two-phase diffusion layer one mil thick was also observed.

The embodiments of the invention in which an exclusive property or privilege is claimed are defined as follows:

1. An exhaust manifold reactor inner chamber composed of a non-magnetic, austenitic, iron-nickel-chromium alloy, as substrate, which, by weight, has an iron content of 22–55%, a carbon content of less than 0.5%, a chromium content of at least 10%, a nickel content of at least $11\% + 0.7 \times$ percent Cr but not greater than 50%, and a total iron, nickel and chromium content of at least 90%, said chamber having on substantially all surfaces an aluminum-containing diffusion coating 1–10 mils thick containing a layer 0.5–7 mils thick which contains a major amount of nickel aluminide of the crystalline structure of NiAl, said coated alloy not having a magnetic attraction greater than 20% that of fully annealed S.A.E. 1020 steel.

2. The exhaust manifold reactor inner chamber of claim 1 in which the substrate contains 25–50% iron, less than 0.2% carbon, at least 15% chromium, a nickel content of at least $15\% + 0.7 \times$ percent Cr but not greater than 45%, and a total iron, nickel and chromium content of at least 95%, the nickel aluminide layer is 1–5 mils thick and the magnetic attraction of the coated alloy is not greater than 15% that of fully annealed S.A.E. 1020 steel.

3. The exhaust manifold reactor inner chamber of claim 2 in which the substrate contains 44–48% iron, less than 0.1% carbon, 30–34% nickel, 18–22% chromium and a total iron, nickel, chromium content of at least 97%.

4. The exhaust manifold reactor inner chamber of claim 3 in which the aluminum-containing diffusion coating is applied by hot dipping in aluminum followed by heat treating to diffuse the aluminum into the substrate.

5. The exhaust manifold reactor inner chamber of claim 1 in which the aluminum-containing diffusion coating is transferred to the substrate from a suitable carrier material and said coating is 2–10 mils thick.

6. The exhaust manifold reactor inner chamber of claim 5 in which the substrate contains 25–50% iron, less than 0.2% carbon, at least 15% chromium, a nickel content of at least 15%+0.7×percent Cr but not greater than 45%, and a total iron, nickel and chromium content of at least 95%, the nickel aluminide layer is 1–5 mils thick and the magnetic attraction of the coated alloy is not greater than 15% that of fully annealed S.A.E. 1020 steel.

7. The exhaust manifold reactor inner chamber of claim 6 in which the substrate contains 44–48% iron, less than 0.1% carbon, 30–34% nickel, 18–22% chromium and a total iron, nickel, chromium content of at least 97%.

8. The exhaust manifold reactor inner chamber of claim 5 in which the aluminum-containing diffusion coating is a chromium and aluminum diffusion coating having an outer layer containing more than 45% by weight chromium, an intermediate layer containing a major amount of nickel aluminide of the crystalline structure of NiAl and an inner layer containing a two-phase mixture of nickel aluminide of the crystalline structure of NiAl and a metallic solid solution containing principally the substrate alloying elements.

9. The exhaust manifold reactor inner chamber of claim 6 in which the aluminum-containing diffusion coating is a chromium and aluminum diffusion coating having an outer layer containing more than 45% by weight chromium, an intermediate layer containing a major amount of nickel aluminide of the crystalline structure of NiAl and an inner layer containing a two-phase mixture of nickel aluminide of the crystalline structure of NiAl and a metallic solid solution containing principally the substrate alloying elements.

10. The exhaust manifold reactor inner chamber of claim 7 in which the aluminum-containing diffusion coating is a chromium and aluminum diffusion coating having an outer layer containing more than 45% by weight chromium, an intermediate layer containing a major amount of nickel aluminide of the crystalline structure of NiAl and an inner layer containing a two-phase mixture of nickel aluminide of the crystalline structure of NiAl and a metallic solid solution containing principally the substrate alloying elements.

References Cited

UNITED STATES PATENTS

| | | | |
|---|---|---|---|
| 2,970,065 | 1/1961 | Greene et al. | 117—131 XR |
| 3,247,666 | 4/1966 | Behrens | 60—29 XR |

JAMES H. TAYMAN Jr., Primary Examiner

U.S. Cl. X.R.

60—30; 75—171; 117—131; 29—196.2; 23—2, 288; 181—36, 49

Dedication 3,505,028.—*Walter Harold Douthit*, Wilmington, Del. MATERIAL OF CONSTRUCTION FOR EXHAUST MANIFOLD REACTOR INNER CHAMBER. Patent dated Apr. 7, 1970. Dedication filed Mar. 24, 1971, by the assignee, *E. I. du Pont de Nemours and Company*.
Hereby dedicates the entire term of said patent to the Public.
[*Official Gazette June 8, 1971.*]